United States Patent
Tatarczyk et al.

(10) Patent No.: US 7,501,647 B2
(45) Date of Patent: Mar. 10, 2009

(54) APPARATUS AND METHOD FOR ACQUIRING AND EVALUATING AN IMAGE FROM A PREDETERMINED EXTRACT OF A PRINTED PRODUCT

(75) Inventors: Theodor Tatarczyk, Grobenzell (DE); Armin Weichmann, Kissing (DE)

(73) Assignee: manroland AG, Offenbach (DE)

( * ) Notice: Subject to any disclaimer, the term of this patent is extended or adjusted under 35 U.S.C. 154(b) by 24 days.

(21) Appl. No.: 11/042,383

(22) Filed: Jan. 25, 2005

(65) Prior Publication Data
US 2007/0007432 A1   Jan. 11, 2007

(30) Foreign Application Priority Data
Jan. 25, 2004   (DE) .................. 10 2004 003 615

(51) Int. Cl.
*G01N 21/86* (2006.01)
*H01L 27/00* (2006.01)
*G03B 7/00* (2006.01)
*H04N 3/14* (2006.01)

(52) U.S. Cl. ..................... 250/559.44; 250/208.1; 396/226; 348/294

(58) Field of Classification Search ............ 250/208.1, 250/559.4, 559.44, 216, 221; 356/342, 402, 356/421, 430, 431; 358/518; 396/226, 268, 396/284, 309; 345/175, 173, 157; 348/294, 348/370, 333.01; 369/89
See application file for complete search history.

(56) References Cited

U.S. PATENT DOCUMENTS

| | | | |
|---|---|---|---|
| 4,459,488 A | | 7/1984 | Uzawa et al. |
| 4,900,146 A | * | 2/1990 | Penney et al. ............. 356/3.01 |
| 4,900,153 A | * | 2/1990 | Weber et al. ................ 356/430 |
| 5,724,259 A | * | 3/1998 | Seymour et al. ........... 382/199 |
| 6,058,201 A | | 5/2000 | Sikes et al. |
| 6,838,687 B2 | * | 1/2005 | Tullis et al. ............ 250/559.07 |

FOREIGN PATENT DOCUMENTS

| | | |
|---|---|---|
| DE | 31 35 740 C2 | 5/1982 |
| DE | 196 05 434 A1 | 8/1997 |
| DE | 195 38 811 C2 | 11/2002 |
| EP | 0 741 032 B1 | 11/2001 |
| JP | 4-88758 A | 3/1992 |
| JP | 10-145679 A | 5/1998 |

* cited by examiner

*Primary Examiner*—Georgia Y Epps
*Assistant Examiner*—Don Williams
(74) *Attorney, Agent, or Firm*—Heydig, Voit & Mayer, Ltd

(57) ABSTRACT

An apparatus for acquiring and evaluating an image of a predetermined extract of a printed product removes the effects of scattered light to improve the accuracy of image evaluation. The apparatus uses a camera that has an electronic image sensor with a two-dimensional arrangement of sensor elements. An aperture stop is arranged in the beam path of the camera for shadowing a predetermined part of the image sensor. When an acquired image is read from a part of the image sensor that is not shadowed, corresponding readings from the shadowed portion of the sensor are subtracted from the acquired image to obtain intensity signals corrected for scattered light.

23 Claims, 4 Drawing Sheets

APPARATUS AND METHOD FOR ACQUIRING AND EVALUATING AN IMAGE FROM A PREDETERMINED EXTRACT OF A PRINTED PRODUCT

FIELD OF THE INVENTION

The invention relates to an apparatus and method for acquiring and evaluating an image from a predetermined extract of a printed product, and more particularly to an arrangement for removing the effects of error sources such as scattered light to improve the accuracy of the image evaluation.

BACKGROUND OF THE INVENTION

During a printing operation, for the purpose of process monitoring, it is usual to provide printed control strips with colored test patterns outside the subject on sheets or webs to be printed. These control strips, whose longitudinal direction is transverse with respect to the transport direction of the printing material, contain a set of measurement areas which are repeated periodically in the longitudinal direction. A specific characteristic variable that characterizes the printing quality can be measured on each measurement area.

For example, in the case of four-color printing, a typical configuration of a control strip is a sequence of measurement areas which are printed with the full-tone colors black, cyan, magenta and yellow, in order to permit a measurement of the respective ink density. By using such ink density measurements, conclusions about the ink supply in the inking unit of the press can be obtained, and its setting can be optimized when starting up the press. In continuous operation, the measurements are used for the purpose of monitoring and documenting the maintenance of required set points. In this case, the periodic repetition of the measurement areas in the control strip results from the need to check the homogeneity of the ink supply over the width of printing material. The periodic spacing of the measurement areas depends on the zone subdivision of the ink supply over the printing material width in the inking unit of the press. These substantially periodic areas can be assigned further areas for the measurement of further variables characteristic of the printing process, and it is possible for further areas to be distributed both with the same or different periods and also irregularly.

For measurements of this type, it is known to arrange a measuring apparatus in a press. The main components of the measuring apparatus include a light source for illuminating the printed product, a camera aimed at the printed product for recording an image from an extract of the printed product, and an electronic evaluation unit. In this case, the aforementioned extract of the printed product has a control strip of the type mentioned above. The camera has an electronic two-dimensional image sensor, from which the evaluation unit reads the images acquired and from these determines characteristic variables of the printed product, for example, density values of the printed inks. Apparatuses of this type and methods for their operation are described in EP 0 741 032 B1 and DE 195 38 811 C2.

In order to achieve high accuracy in the determination of the characteristic variables of interest, a plurality of error sources have to be taken into account when performing measurements of the type in question, and appropriate corrections have to be provided. These error sources include in particular the stray light falling onto the image sensor during the measurement. Other error sources include inaccuracy in the references for the zero light intensity and the intensity of the light shone onto the printed product by the light source.

In order to take into account the dark current of photoelectric sensors, which is the output signal of the sensors when there is no illumination, an image which corresponds to a completely black area can be recorded as a black reference, and can be included in a suitable way in the image evaluation. Furthermore, the intensity of the light reflected from a white (i.e., unprinted) area is of interest for the image evaluation, since this is involved in particular in the very important evaluation of the characteristic variable ink density.

Thus, in EP 0 741 032 B1, a measuring apparatus arranged in a press is described in which a black reference area and a white reference area each having an exactly known spectral reflectance characteristic are arranged laterally outside the movement path of the printing material. For the purpose of calibrating the image sensor, during the commissioning of the apparatus, a plurality of images of each of the two reference areas is recorded and these, the zero point and the maximum value of the intensity, are set iteratively in the evaluation unit based on the recorded images. As an alternative to this, in DE 195 38 811 C2, the black reference proposed is an image recorded with the camera objective covered or an image recorded from a black area without illumination, and the white reference proposed is an image recorded from an unprinted region of the printing material with illumination.

An error source with a considerable influence on the measurement accuracy is the scattered light, i.e., the incidence of light on a sensor element of the image sensor which does not come from that section of the area of a measuring area on a printed product associated with the relevant sensor element. Therefore, attempts are made to determine a measure of the scattered light incident on the image sensor in order to be able to carry out a suitable correction during the processing of the intensity signals supplied by the image sensor.

For this purpose, it is proposed in EP 0 741 032 B1 to provide specific test patterns for the acquisition of scattered light data, to record a plurality of images of these test patterns in advance and to use these to calculate a compensation curve, from which correction factors for the elimination of the scattered light influence can be taken during the processing of the images of colored measuring areas.

DE 195 38 811 C2 instead teaches the application of digital filtering of the recorded images to eliminate the scattered light influence. The filter coefficients are calculated in accordance with a complicated mathematical method by using the intensity transition at a black/white edge contained in the control strip with colored measuring areas. In this case, a mathematical model for the distortion of an ideal black/white edge by the light scatter, known as an unsharp function, is used as a basis for the calculation.

The known concepts for reducing measurement errors during the characterisation of printed products appear overall to be complex and time-consuming. Application in continuous printing operation would therefore permit only a relatively low measuring frequency, which at least calls into question the use of the measured data for the regulation of processes in the press. On the other hand, given only one acquisition of reference data and setting of compensating and correction parameters before the start of printing operation, the accuracy of the measured data during relatively long operation is not ensured.

BRIEF SUMMARY OF THE INVENTION

In view of this prior art, the object of the invention is to provide an apparatus and a method for acquiring and evaluating an image from an extract of a printed product which makes it possible to determine characteristic variables of the printed product during its production in a press with the least possible expenditure on apparatus, both with high accuracy and at high speed.

These objects are achieved by an apparatus according to the invention. The apparatus according to the invention is distinguished by the feature that an aperture stop is arranged in the beam path of a camera between the printed product to be examined and a two-dimensional image sensor contained in the camera to shadow part of the image sensor. This shadowed part of the sensor thus receives only scattered light. Because of the relatively small dimensions of the active area of an electronic image sensor, it can be assumed that the scattered light incident on the shadowed part represents a relatively accurate measure of the scattered component of the light incident on the unshadowed part of the sensor.

It is particularly advantageous if the aperture stop is shaped and arranged in such a way that the part of the image sensor shadowed by it extends next to an acquisition region of the image sensor that is used for the acquisition of the image of the extract of the printed product to be examined. The local proximity of the two parts of the image sensor in this case ensures particularly good agreement of the respective extent of incident scattered light. In this case, local proximity means that the distance of the shadowing region from the acquisition region is small as compared with the total dimensions of the image sensor. This distance is preferably also smaller than the extent of the acquisition region at a right angle to its edge lying closest to the shadowing region. Direct adjacency of the two regions is the closest possible form of proximity and, to this extent, is optimal but not absolutely necessary.

If the extract of the printed product to be acquired, i.e., the measuring area, is strip-like overall, then the acquisition region of the image sensor used for the purpose is also strip-like. In this case, the shadowed part of the image sensor should likewise be strip-like and extend parallel to the acquisition strip, and the two strips should preferably be chosen to be equally wide.

In order to project the measuring area onto the image sensor, an objective lens can be used. In this case the aperture stop should be arranged in the beam path in front of the objective, in order to have the division of the beam path by the aperture stop become effective within the objective as well.

In order to keep the extent of the scattered light incident on the sensor as low as possible from the start, it is advantageous if the camera has a housing which is blackened, at least on the inside, which surrounds the objective and the image sensor and on or in which the aperture stop is also fitted.

Contamination of the components arranged in the housing, in particular the objective, by colored particles possibly emitted by the freshly printed product, which would in particular result in an increase in the light scattering, can be avoided by feeding a compressed air flow aimed at the printed product away from the objective. In this case, for reasons of safety, in order to protect the objective, a mechanical shutter can be provided which closes in the event of failure of the compressed air supply.

The arrangement of polarisation filters with mutually perpendicular polarisation directions after the light source and in front of the objective may be used if ink density values of the printing inks are to be determined as characteristic variables of the printed product.

A second aspect of the invention consists in a method which makes use of the apparatus according to the invention. By means of the subtraction of intensity values read from the shadowed part of the image sensor from intensity values read from the unshadowed part, extremely effective suppression of the influence of scattered light is achieved. This subtraction needs very little time and can be carried out each time the image sensor is read, without the cycle time of the image data acquisition and processing being prolonged substantially. In particular, no special measuring cycles for the determination of scattered light reference data are incurred.

For the purpose of further processing for the determination of the characteristic variables of interest, the corrected intensity values from which the scattered light influence has been eliminated to the greatest possible extent can then be used.

It is advantageous in the sense of the highest possible measurement accuracy to combine the suppression of scattered light with measures for calibrating the zero point and the maximum value of the intensity. For this purpose, images recorded without illumination, preferably those from black measuring areas, and images recorded with illumination from white measuring areas, can be used as black and white reference, respectively. Of course, this assumes the presence of white measuring areas within the control strip provided on the printed product for the measurements. Here, too, in principle only simple subtractions are needed as mathematical operations.

If the two parts of the image sensor are mutually parallel, rectangular strips, these can be subdivided into sections adjacent to one another, of which each section of the shadowed part forms the scattered light reference for the adjacent section of the unshadowed part. The result of this, because of the close local proximity of the two associated sections, is particularly good agreement of the incidence of scattered light.

Each characteristic variable to be determined is expediently assigned a section of the image sensor, and exactly one measuring area of the control strip of the printed product is projected onto each such section. In this case, by means of averaging over the intensity signal from each section of the image sensor, the signal/noise ratio can be increased. In the present connection, characteristic variables of interest are primarily the intensity and spectral color composition of a recorded measuring area.

In order to permit the image acquisition during the movement of a printed product in a press, it is expedient to operate the light source in a pulsed manner, the intensity and duration of the light flashes being dimensioned such that the recording region of the camera is illuminated only during the presence of the control strip to be recorded, and the illumination is matched to the dynamic range of the image sensor.

The high measuring frequency that can be achieved with the invention permits the use of the characteristic variables determined for the regulation of processes in a press during continuous operation. For example, in particular ink density values can be used for regulating the ink supply in the inking unit of the machine.

Instead of a control strip specifically provided for the purpose, part of the subject being printed can also be projected onto the image sensor, registered by the latter and evaluated in order to determine characteristic variables. In this way, the area needed for a control strip is saved and the removal of the control strip from the printed product by cutting it off is no longer required. In this case, the measuring areas can be defined by information from processes upstream of the printing process, in particular from the pre-press stage.

In the following text, an exemplary embodiment of the invention will be described by using the drawings, in which:

DETAILED DESCRIPTION OF THE INVENTION

The application of the present invention in a preferred embodiment assumes that a control strip is provided on the printed product to be characterized. In the case of sheet printing, the control strip is printed on each sheet. In the case of an endless printing material web, the control strip is printed onto the web at regular intervals. Part of such a control strip 1 is illustrated schematically in FIG. 1. The strip 1 extends transversely with respect to the transport direction of the printed products in the press and, in its longitudinal direction, contains a periodic sequence of individual rectangular measuring areas 2.

The measuring areas are printed with different test patterns, each of which is designed for the determination of a specific characteristic variable by measurement. Typical examples of such test patterns are full-tone prints in the primary colors cyan, magenta, yellow and black for determining the respective ink densities. Furthermore, half-tone prints in the primary colors, for example, can be provided as a test pattern for determining half-tone values and color register marks. In detail, the configuration of the measuring areas depends on the press whose printing quality is to be optimized and monitored with the aid of the control strip 1.

The pattern sequence is repeated periodically along the control strip 1, in order to permit locally resolved measurement of the entire width of the printing material, which is necessary in particular with regard to the local distribution of the ink feed points over the width of the printing material in the inking unit of a press. Thus, in the example shown in FIG. 1, seven different printed areas 2 are arranged beside one another and are repeated at regular intervals. The individual groups of these seven areas are each separated from an adjacent group by an unprinted white area. This white area 3 is used, as will be explained further, as a white reference for the evaluation of the measured intensity values of the light reflected at the remaining seven areas.

Figure 1:
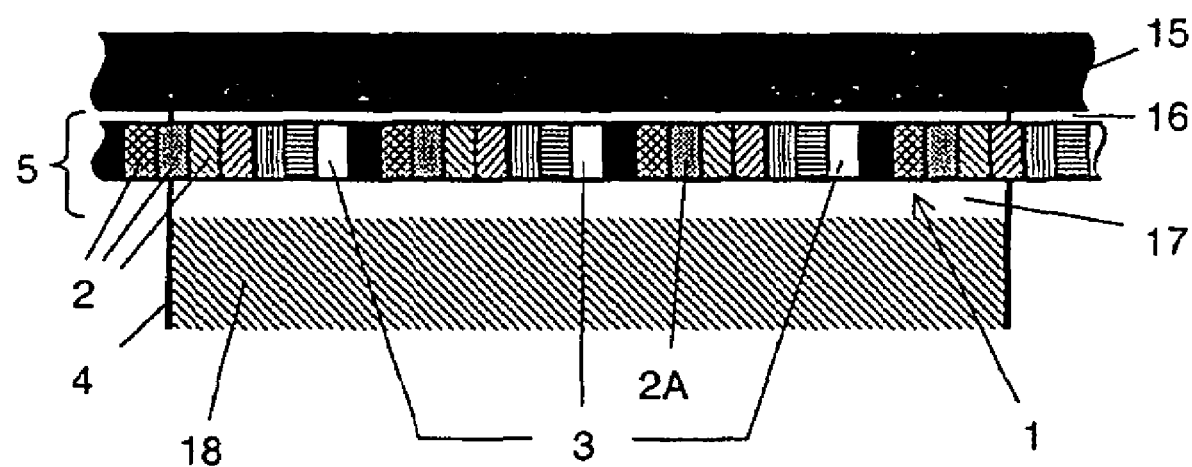
FIG. 1 shows a plan view of an extract of a printed product having a control strip.

In relation to FIG. 1, it should also be noted that the hatching patterns illustrated in the measuring areas 2 there do not represent the test patterns actually printed but are only intended to illustrate the ability to distinguish the individual patterns.

In FIG. 1, a region of the printed product comprising a plurality of periods of the test patterns 2, which could potentially be acquired by an electronic camera 6 according to the invention, is marked by the frame 4. Of the entire region that can be acquired, only the part containing the measuring strip 1 and its surroundings is illustrated in FIG. 1. The other end of the region that can be acquired, which is the upper horizontal edge of the frame 4, is located under the black part 15, whose significance will be discussed further below. In practice, only one extract 5, which is somewhat wider than the measuring strip 1, is acquired by the camera 6. The reason for this will likewise be explained further below.

Figure 2:
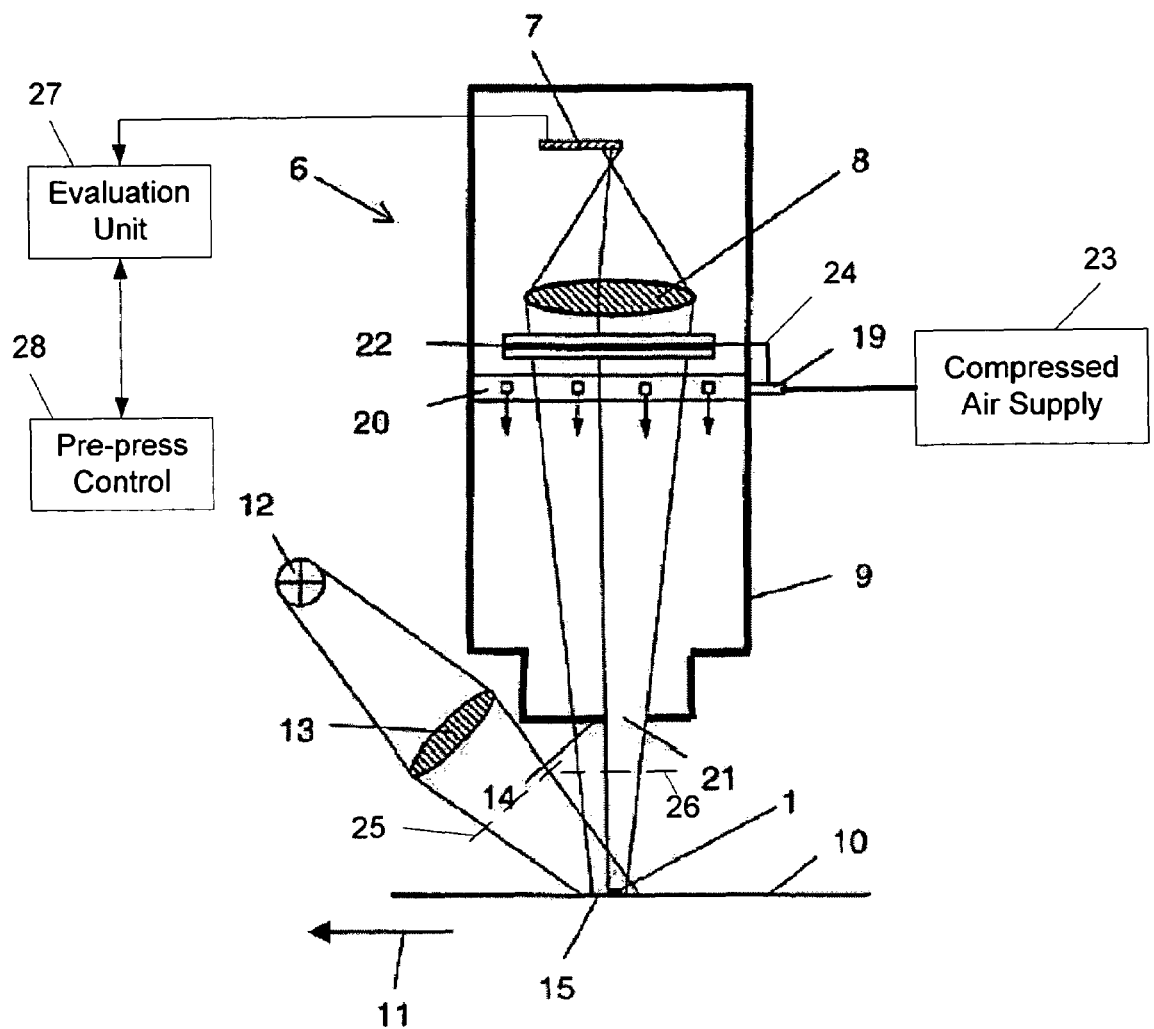
FIG. 2 shows a schematic cross-sectional view of the camera of an apparatus according to the invention.

The camera 6, which is illustrated schematically in FIG. 2, comprises as main components an image sensor 7, which is a two-dimensional sensor, an objective 8, which projects the extract 5 of the printed product 10 onto the image sensor 7, and a housing 9, which for the most part encloses the beam path from the printed product 10 to the image sensor 7. In the illustration in FIG. 2, a control strip 1 is currently located in the viewing region of the camera 6 and is consequently projected onto the image sensor 7.

The image acquisition by the image sensor 7 takes place during the movement of the printed product 10, whose direction of motion is identified by the arrow 11. For this purpose, the light source 12 used to illuminate the printed product 10, whose light is focused onto the viewing region of the camera 6 by optics 13, is operated in a pulsed manner. During the presence of a control strip 1 in the viewing region of the camera 6, it emits a short flash of light, by means of which a specific instantaneous recording of the strip 1 is made possible. The image acquired by the image sensor 7 is read and analyzed by an evaluation unit 27.

There are different possible ways of acquiring color-selective information from the control strip 1. For instance, a color image sensor, i.e., an image sensor 7 with color-selective pixels, can be used. The implementation of color selectivity is not the subject of the present invention and will therefore not be explained specifically here.

Figure 3:
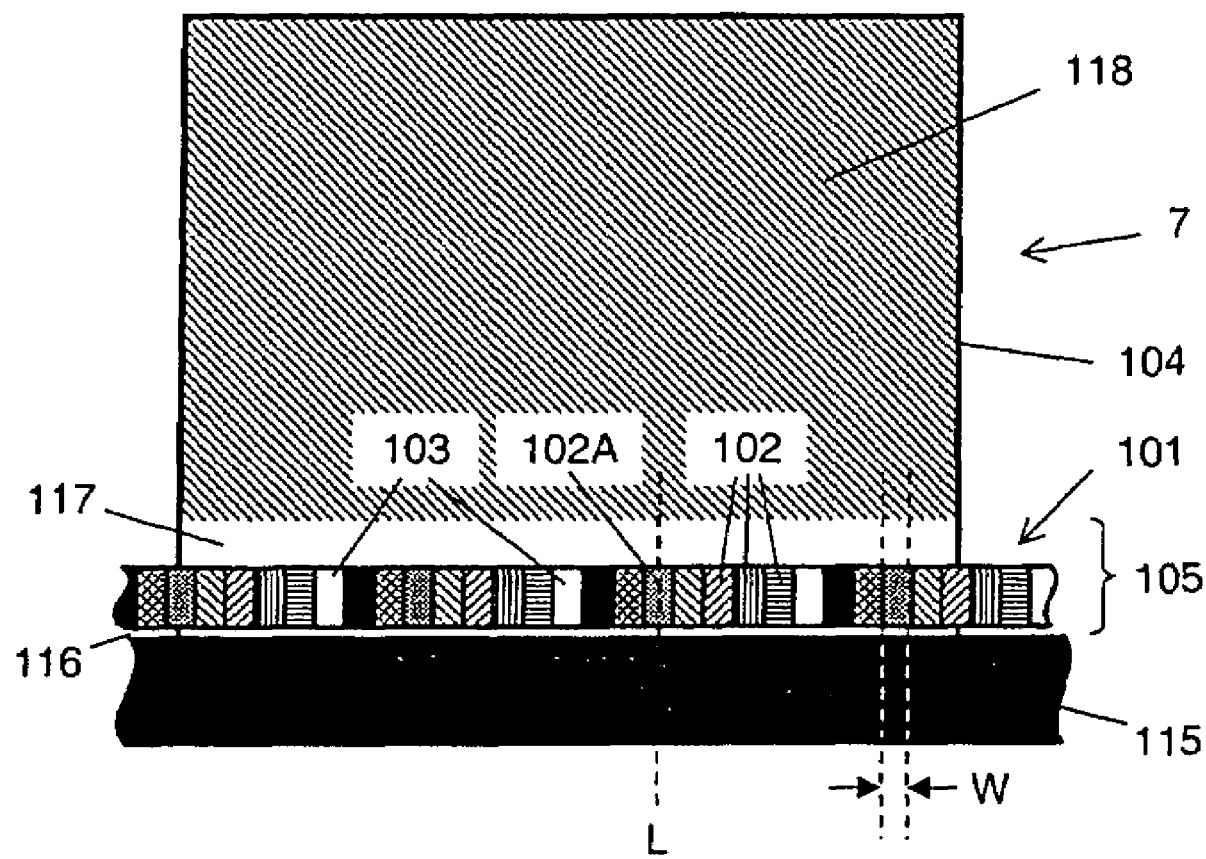
FIG. 3 shows a plan view of the image sensor of the apparatus according to the invention with the image of the extract from the printed product from FIG. 1.

Since two-dimensional image sensors available on the market usually have a rectangular matrix of image points (pixels), whose length/width ratio is very much closer to one (1) than that of a control strip 1, which is designed to be as narrow as possible in order to minimize the consumption of printing material, only a small part of the active area of the image sensor 7, marked by the frame 104 in FIG. 3, is needed in order to record the image of a control strip 1.

The invention makes use of this fact, in that a portion of the image sensor 7 is used to record a scattered light reference at the same time as the image of the control strip 1. For this purpose, the camera 6 has an aperture stop 14, which shadows part of the image sensor 7, on which a strip 15 adjacent to the control strip 1 would be projected by the objective 8. In the plan view of FIG. 1 of the printed product 10, this strip 15, which is not projected onto the image sensor 7 as a result of the action of the aperture stop 14 and which in the following text is designated the scattered light reference strip 15, is shown as a black bar which extends parallel to the measuring strip 1 at a short distance from the latter. As will be explained further below, for the purpose of evaluating the image recorded by the image sensor 7, only the images of the measuring strip 1 and of the scattered light reference strip 15 are processed.

Between the upper edge of the measuring strip 1 and the lower edge of the scattered light reference strip 15 there is an unprinted strip 16 on the printed product 10. A further unprinted strip 17 is located between the lower edge of the measuring strip 1 and the lower edge of the extract 5 of the printed product 10 projected onto the image sensor 7. The region 18 located underneath the lower edge of the extract 5 and hatched in FIG. 1 is covered by a part of the housing 8 of the camera 6 which is located opposite the aperture stop 14, and is thus not projected onto the image sensor 7. In principle, the scattered light reference strip 15 could adjoin the measuring strip 1 directly.

The image on the image sensor 7, resulting from the previously described construction of the camera 6, of the extract 5 of the printed product 10 marked by the frame 4 in FIG. 1 is illustrated in FIG. 3. In this case, the outer edge 104 of the active area of the image sensor 7 corresponds to the frame 4 shown in FIG. 1 of the region of the printed product 10 which is the maximum that can be acquired in theory. The image 101 of the control strip 1 appears in reduced form on the image sensor 7. The camera 6 and the image sensor 7 are aligned in relation to the printed product 10 such that one edge of the edge 104 runs parallel to the longitudinal edges of the strip image 101. The region of the image sensor that is shadowed by the aperture stop 14 is illustrated as a black bar or strip 115 in FIG. 3. The predominant part 118 of the image sensor is not used and is not read. Only that part 105 of the image sensor 7 onto which the strip-like extract 5 of the printed product 10 is projected, and also the shadowed part 115, are provided to be read.

Although the scattering of light in the beam path from the printed product 10 to the image sensor 7 can be limited by suitable measures, such as at least blackening the inner side of the surface of the housing 9 and using a low-scatter objective 8, a certain amount of scattering of light remains unavoidable, so that a small amount of scattered light which does not originate from the respectively associated measuring area 2 also gets into the image 102 of each measuring area 2 and, to this extent, distorts the light intensity measured in the respective measuring area image 102. This measurement error resulting from scattered light limits the accuracy of the intensity management critically and therefore also the determination of the characterizing characteristic variables of the printed product 10 which can be calculated from the measured intensity data.

Figure 4:
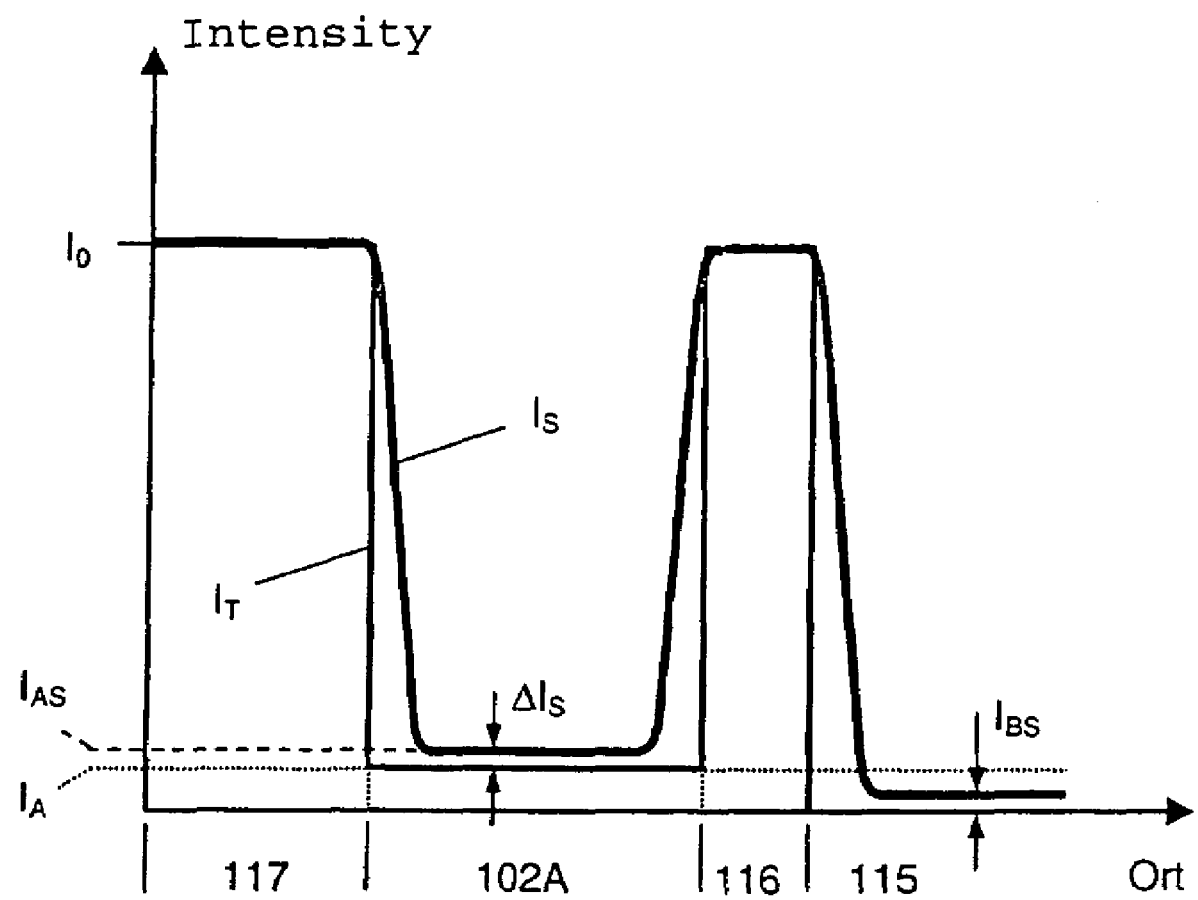
FIG. 4 shows the theoretical and the measured course of the light intensity along the line L in FIG. 3.

In FIG. 4, the course of the measured light intensity along the dashed line L in FIG. 3 is illustrated qualitatively from top to bottom. The line L runs in the part 105 of the image sensor 7 onto which the strip-like extract 5 of the printed product 10 is projected, firstly through a region 117 onto which an unprinted (i.e., white) region 17 of the printed product 10 is projected. This is followed by the region 101 which contains the image of the measuring strip 1. In this case, the line L runs through the image 102A of a measuring area 2A. There follows a further region 116, onto which an unprinted (i.e., white) region 16 of the printed product 10 is again projected. The widths of the regions 116 and 117 that are illustrated here should be understood as purely exemplary in this case. Finally, the line L enters the shadowed region 115. The illustration in FIG. 4 begins on the left with the entry of the line L into the region 117 and ends on the right within the shadowed region 115.

In FIG. 4, two qualitative curves of the intensity of the light received by the image sensor 7 along the line L are shown, of which the curve $I_T$, which is drawn narrower and runs abruptly, represents the theoretical course of the intensity without taking into account of the scattering of light, and the curve $I_S$, which is drawn wider and runs continuously, represents the course of the intensity with the scattering of light taken into account. Error sources other than the scattering of light are not taken into account in FIG. 4, however.

In the white region 117, the two curves initially virtually coincide, since the contribution of the scattering of light to the measured intensity is negligibly small there. At the edge between the white region 117 and the image 102A of the colored measuring area 2A, the theoretical intensity $I_T$ falls abruptly to a substantially lower value $I_A$. From this value $I_A$ and that $I_0$ from the white region 117, the exact ink density of the colored measuring area 2A could be calculated. In the case of the real intensity $I_S$, as a result of the scattering of light, a continuous instead of an abrupt transition occurs. The transition moves to a likewise substantially lower value $I_{AS}$ which, however, even following the decay of the edge effects in the central part of the measuring field image 102A, is still somewhat greater than the theoretical value $I_T$.

The deviation $\Delta I_S$ of the two curves $I_T$ and $I_S$ in the central part of the measuring area image 102A is the sole consequence of the scattered light which the image sensor 7 receives in this region. As used herein, "scattered light" means the light which does not originate from the measuring area 2A but from other points of the printed product 10, and gets to the pixels under the image 102A of the measuring area 2A as a result of scattering in the beam path of the camera 6.

At the transition to the narrow white strip 116, in both curves $I_T$ and $I_S$ there is a rise of the intensity again to the same value $I_0$ as in the region 117, this rise again being abrupt in the case of the curve $I_T$ and, in the case of the curve $I_S$, again running continuously with a slope whose magnitude is similar to that during the previous fall.

At the edge between the white strip 116 and the strip 115 shadowed by the aperture stop 14 there is once again a fall in the case of both curves $I_T$ and $I_S$, specifically exactly to the value zero in the case of the theoretical curve $I_T$ since, as a result of the shadowing action of the aperture stop 14, no light at all should get into the shadowed strip 115. In the case of the curve $I_S$, the drop does not run abruptly, as before, but again continuously and, even in this case, outside the marginal region, there remains a constant residual intensity $I_{BS}$ different from zero since, as a result of scattering of light in the beam path of the camera 6, a certain amount of residual light still gets into the strip 115.

If, then, as in the example shown, the image 101 of the measuring strip 1 and of the shadowed strip 115 lie relatively close beside each other, it can be assumed that the constant residual value $I_{BS}$ of the real intensity $I_S$ in the shadowed strip 115 corresponds to a very good approximation to the difference $\Delta I_S$ between the measured intensity $I_{AS}$ and the theoretical intensity $I_A$ in the image 102A of the measuring area 2A. By means of subtraction of the value $I_{BS}$ measured in the shadowed strip 115 from the value $I_{AS}$ measured in the image 102A of the colored strip 2A, the theoretical value $I_A$ there can thus be calculated relatively accurately and the measurement error caused by the scattering of light in the beam path of the camera 6 can be eliminated. In other words, to a very good approximation, it is correct that:

$$I_A = I_{AS} - \Delta I_S \approx I_{AS} - I_{BS} \qquad (1)$$

The mathematical expenditure for carrying out the scattered light correction therefore only amounts to a simple subtraction, which requires only a little expenditure of computing time. This is of important significance for the application of the intervention for the real-time regulation of operating parameters of a press in continuous operation.

Before the error correction by means of subtraction explained previously, averaging over the intensity values of all the pixels of each measuring area image 102 is carried out. This is because each individual measuring area image 102 of the measuring strip image 101 is used only to determine one or more characteristic variables which are assigned wholly to the corresponding measuring area 2, and no local resolution is normally needed within the individual measuring area images 102. By means of this averaging, the signal/noise ratio of the measurement can be improved effectively. In this case, only the flat central region of the intensity is included in the averaging, in order to exclude the edge effects occurring at the edges of the measuring area images 102.

The same is also true with the same effect of the shadowed strip 115. In order to maintain the local proximity between measuring region and reference region, the shadowed strip 115 is subdivided into a large number of individual sections. Each section is assigned to a closest measuring area image 102, and has the same width W as that closest measuring area. The averaging is carried out within the shadowed strip 115 for each individual section of the width W, and the average intensity of the respectively associated section of the shadowed strip 115 is subtracted from the average intensity of a measuring area image 102.

All the variables mentioned previously by using FIG. 4 are accordingly preferably to be understood to mean values averaged over the measuring area image 102A and, respectively, the section of the strip 115 associated therewith. If an evaluation with local resolution is intended within a measuring area image 102A, as can be the case when, for example, the imaged measuring area 2A contains a colored pattern, then the quality of the image to be evaluated could be improved by means of the subtraction of the residual intensity value $I_{BS}$ (average) of the associated section of the strip 115 carried out pixel-by-pixel. In this case, however, the averaging within the measuring area image 102A would be omitted.

It should be noted that the individual measuring areas 2 do not necessarily have to have the same width W in the longitudinal direction of the measuring strip 1. Incidentally, the extent of the measuring strip image 101 and of the shadowed strip 115 in their transverse direction, which is the direction of the line L in FIG. 3, does not necessarily have to be the same either, even though this is preferred.

In another advantageous embodiment, no specific press control strip has to be used, but strip-like regions of the actual useful region of the printing material are measured and previously defined suitable measuring areas are evaluated. Thus, part of the subject being printed can also be projected onto the image sensor, registered by the latter and evaluated in order to determine characteristic variables. In this way, the area needed for a control strip is saved and the removal of the control strip from the printed product by cutting it off is no longer required. In this case, the measuring areas can be defined by information from processes upstream of the printing process, in particular from the pre-press stage. As shown in FIG. 2, the information is transmitted from a pre-press control unit 28 to the evaluation unit 27.

In a further advantageous embodiment, the measuring system receives the information about suitable measuring locations (longitudinal and transverse position) as a result of the previous image preparation, for example the prepress stage or other processes which, for example, analyse the image data in accordance with predefined criteria in order to find measuring areas for the measuring system.

In order to eliminate the influence of the dark current of the sensor elements, which is the intensity signals supplied by the sensor elements when there is no illumination, images are recorded with the illumination 12 switched off at regular intervals, preferably always between respective two recordings of a control strip 1. In the process, both the part of the image sensor 7 intended to acquire the measuring strip image 101 and the region provided as reference strip 115 are read and the corresponding intensity values are stored as zero reference values.

Within the context of the evaluation of the intensity signals obtained from the measuring strip image 101, when averaging over the individual measuring area images 102 is provided, this averaging is also carried out on the zero reference values. In this case, for each individual measuring area image 102A, only a single zero reference value $I_{AD}$ (index D for dark) is stored. In addition, in the case of the associated sections of the reference strip 115, only a single zero reference value $I_{BD}$ per section is determined by averaging and stored.

In order to eliminate the measuring errors caused by the dark current as well, apart from the scattered light errors, in order to calculate the true intensity $I_A'$ in the measuring area image 102A, the respective zero reference value $I_{AD}$ or $I_{BD}$ is subtracted both from the measured intensity value $I_{AS}$ of the measuring area image 102A and from the measured intensity value $I_{BS}$ of the associated section of the shadowed reference strip 115, so that the true intensity value $I_A'$ is given as follows:

$$I_A' = (I_{AS} - I_{AD}) - (I_{BS} - I_{BD}) \qquad (2)$$

The order of the calculation operations can of course be varied with respect to Formula (2) within the context of the transformations which are permitted algebraically.

An important characteristic variable for characterizing the quality of a printed product is the ink density, in which the reflected intensity of a printed area is related to that of the unprinted printing material. For this purpose, the measuring strip 1 shown in FIG. 1 has white measuring areas 3 at regular intervals.

These white measuring areas 3 are, according to the invention, recorded by the camera 6 at the same time as all the other measuring areas 2 of the measuring strip 1 and appear on the image sensor 7 as white area images 103. The intensity signals obtained from this are subjected to the same operations described previously as the intensity signals measured on all the other measuring areas 2, and accordingly, with analogous application of Formula (2), lead to appropriately corrected white intensities $I_0'$. The ink density can then be calculated by using these white intensities $I_0'$.

Distributing a plurality of white areas 3 along the measuring strip 1 ensures that any possible inhomogeneity of the intensity of the light source 12 over the width of the printed product 10, i.e., over the length of the measuring strip 1, has no detrimental effect on the accuracy of the ink density values determined. In order to calculate the ink density for each measuring area image 102, the corrected white intensity $I_0'$ of the respective closest white area image 103 is used. Furthermore, as a result of the simultaneous recording of the white measuring areas 3 with the printed measuring areas 2, any possible fluctuation of the intensity over time of the light shone in by the light source 12 is compensated for during the ink density evaluation, since the reflectance of the white areas 3 is affected to the same extent by this as the reflectance of the printed measuring areas 2.

A freshly printed product 10 potentially emits colored particles which, as a result of their presence within the housing 9 of the camera 6, would increase the extent of light scattering in the beam path there and, furthermore, could be deposited on the surface of the objective 8 and as a result cause a permanent rise in the light scattering. In order to minimize the scattering of light as an error source from the start and in this way to make the task of compensating for its effect easier, the invention therefore provides for the camera to have a compressed air connection 19 and a compressed air distributor 20. By means of the compressed air distributor 20, during the operation of the camera 6, an air flow aimed away from the objective 8 towards the viewing opening 21 is produced within the housing 9, and is indicated in FIG. 2 by arrows aimed downward. This air flow keeps the beam path within the housing 9 free of particles, in particular the aforementioned colored particles, but also of dust particles. The compressed air supplied to the connection 19 should itself be free of particles, and should be filtered if necessary.

Furthermore, in order to protect the objective 8, the camera 6 also contains a mechanical shutter 22, which is opened only during the operation of the camera 6. The control of the shutter 22 is coupled to the compressed air supply 23 in such a way that the shutter can be opened only when there is a predetermined minimum positive pressure and closes automatically when the positive pressure falls below this minimum value. This can be achieved by means of an electronic control system, but also by means of a direct pneumatic coupling 24 between the shutter 22 and the compressed air distributor 20. In this way, contamination of the surface of the objective 8 in the event of failure of the compressed air supply during operation is prevented.

In order to determine the intensity as a characteristic variable of interest, the reflection of light from the printed product 10 should be measured without the direct surface reflection. To this end, polarization filters 25, 26 with mutually perpendicular polarisation directions may be placed in the beam paths from the light source 12 to the printed product 10 and from there to the image sensor 7, respectively.

What is claimed is:

1. An apparatus for acquiring and evaluating an image of a predetermined extract of a printed product, comprising: a camera having an image sensor with a two-dimensional arrangement of sensor elements each corresponding to an image point, an acquisition portion of the image sensor being positioned for acquiring an image of the predetermined extract of the printed product; an evaluation unit for reading and processing an image of the predetermined extract acquired by the image sensor; and an aperture stop positioned to prevent light from the printed product from directly reaching a shadowed portion of the image sensor of the camera, wherein the shadowed portion of the image sensor comprises a strip within an otherwise unshadowed portion of the image sensor.

2. An apparatus as in claim 1, wherein the aperture stop is shaped and arranged such that the shadowed portion of the image sensor is adjacent to the acquisition portion.

3. An apparatus as in claim 1, wherein the shadowed portion and the acquisition portion are rectangular strips parallel to each other in the two-dimensional arrangement.

4. An apparatus as in claim 1, wherein the camera has an objective for projecting light from the predetermined extract onto the acquisition portion of the image sensor, and wherein the aperture stop is arranged in a beam path of the camera in front of the objective.

5. An apparatus as in claim 1, wherein the camera includes a housing having a black inner surface and enclosing the image sensor and the objective, and wherein the aperture stop is mounted in or on the housing.

6. An apparatus as in claim 5, wherein the camera has a compressed air connection and a compressed air distributor for supplying compressed air into an interior of the housing to generate an air flow aimed away from the objective.

7. An apparatus as in claim 6, wherein the camera further includes a mechanical shutter disposed in the housing and coupled to the compressed air connection such that the mechanical shutter is opened only when a predetermined positive pressure is present at the compressed air connection.

8. An apparatus as in claim 1, further including a light source for illuminating the printed product, a first polarization filter disposed between the light source and the printed product, and a second polarization filter disposed between the printed product and the image sensor, the first and second polarization filters having polarization directions perpendicular to each other.

9. A method of acquiring and evaluating an image of a predetermined extract of a printed product, comprising: providing a camera directed to the printed product for acquiring images thereof, the camera having an electronic image sensor with a two-dimensional arrangement of sensor elements each corresponding to an image point; providing an evaluation unit for reading and processing images acquired by the image sensor; positioning an aperture stop to prevent light from the printed product from directly reaching a shadowed portion of the image sensor, wherein the shadowed portion of the image sensor comprises a strip within an otherwise unshadowed portion of the image sensor; acquiring an image of the predetermined extract using an acquisition portion of the image sensor; reading, by the evaluation unit, intensity signals of the acquired image of the predetermined extract; reading, by the evaluation unit, intensity signals of the shadowed portion of the image sensor; and subtracting the intensity signals of the shadowed portion from the intensity signals of the acquired image to provide corrected intensity signals that are corrected for errors caused by scattered light.

10. A method as in claim 9, further including processing the corrected intensity signals to determine intensities of light from the predetermined extract to the acquisition portion of the image sensor.

11. A method as in claim 9, further including the steps of: obtaining dark-current intensity signals of the image sensor, the dark-current intensity signals representing outputs of the image sensor when the printed product is not illuminated; subtracting the dark-current intensity signals from the corrected intensity signals to produce a second corrected set of intensity signals; and processing the second corrected set of intensity signals to determine intensities of light from the predetermined extract to the acquisition portion of the image sensor.

12. A method as in claim 9, further including the step of determining an intensity of light reflected from an unprinted region of the printed product.

13. A method as in claim 9, wherein the acquisition portion and shadowed portion of the image sensor are rectangular strips adjacent and extending parallel to each other.

14. A method as in claim 9, wherein the acquisition portion has individual sections each assigned to a corresponding and adjacent individual section of the shadowed portion, and wherein the step of subtracting subtracts intensity signals of each individual section of the shadowed portion from intensity signals of a corresponding individual section of the acquisition portion.

15. A method as in claim 14, wherein the step of subtracting includes forming a first average intensity from intensity signals of an individual section of the acquisition portion and a second average intensity from a corresponding individual section of the shadowed portion.

16. A method as in claim 14, further including the step of determining by the evaluation unit from intensity signals of a section of the acquisition portion at least one characteristic variable of the printed product.

17. A method as in claim 16, wherein the predetermined extract of the printed product is a control strip having a plurality of measuring areas disposed outside a printed subject on the printed product, and wherein each section of the acquisition portion is assigned to a corresponding measuring area of the control strip.

18. A method as in claim 17, wherein the characteristic variable is an ink density of a measuring area of the control strip.

19. A method as in claim 17, wherein the characteristic variable of the printed product is a measure of spectral color composition of a measuring area of the control strip.

20. A method as in claim 19, including the step of illuminating the printed product with light pulses, and wherein the step of acquiring is performed during a light pulse.

21. A method as in claim 16, including the step of transmitting the characteristic variable determined by the evaluation unit to a control device for controlling subsequent operation of a press that prints the printed product.

22. A method as in claim 16, wherein the predetermined extract of the printed product is a part of a printed subject on the printed product.

23. A method as in claim 22, wherein the evaluation unit is programmed to receive information defining measuring areas of the predetermined extract.

* * * * *